Nov. 8, 1932.   A. G. PERKINS   1,886,421
PIPE JOINT AND METHOD OF MAKING SAME
Filed Oct. 5, 1928
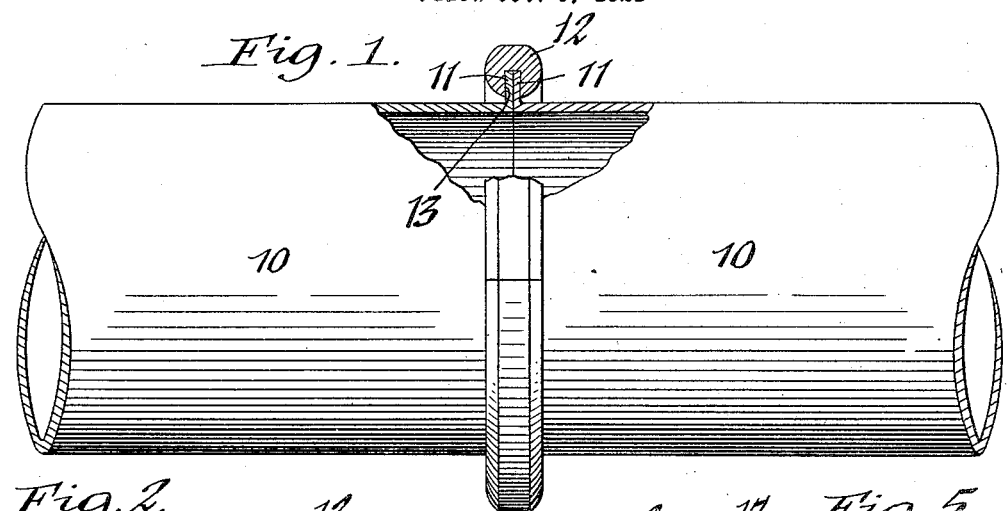
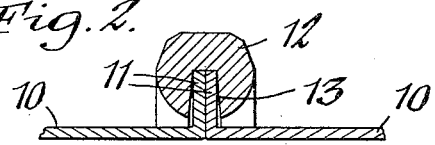
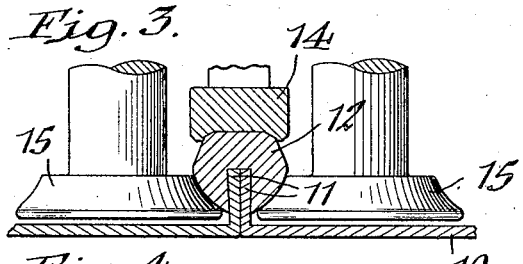
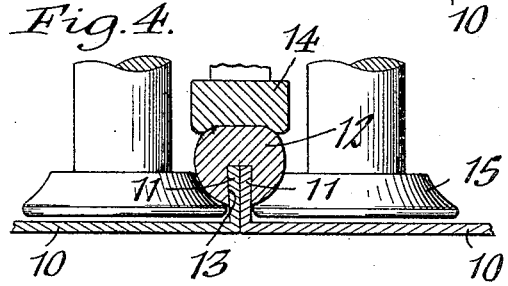
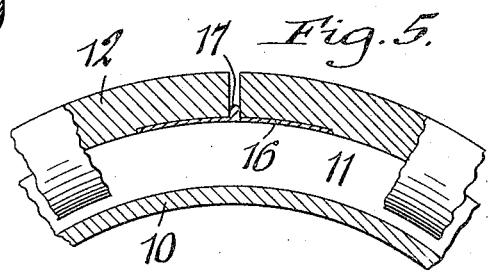
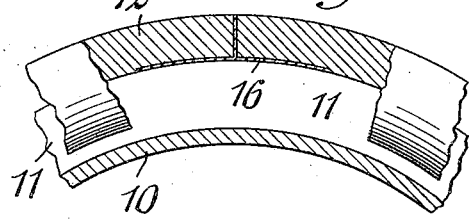
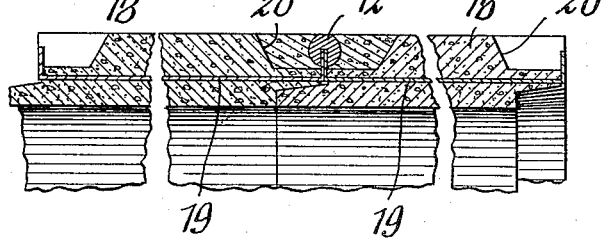
Inventor,
Albert G. Perkins,
by Walter P. Geyer
Attorney.

Patented Nov. 8, 1932

1,886,421

UNITED STATES PATENT OFFICE

ALBERT G. PERKINS, OF BUFFALO, NEW YORK

PIPE JOINT AND METHOD OF MAKING SAME

Application filed October 5, 1928. Serial No. 310,669.

This invention relates to certain novel improvements in pipe joints and to the method of making the same.

One of its objects is to provide a joint for metallic pipes or for concrete pipes equipped with metallic linings which is strong and durable in construction and capable of withstanding maximum pressures, such as in high pressure water lines. Another object of the invention is the provision of a semi-flexible calked, metallic pipe joint which is simple and inexpensive in construction, which can be effectually sealed in a minimum period of time, and which does not require the use of gaskets to render it leak proof.

A still further object of the invention resides in the method employed for sealing the joint.

In the accompanying drawing:—

Figure 1 is a sectional elevation of a pipe joint embodying my invention. Figures 2, 3 and 4 are enlarged sections taken transversely through the joint showing the steps for making the same. Figures 5 and 6 are fragmentary cross sections showing one way of sealing the abutting ends of the clamping ring of the joint. Figure 7 is a fragmentary longitudinal section showing my joint in connection with concrete pipes.

Referring now to Figures 1 to 6 inclusive, 10, 10 indicates the metallic pipe sections which are constructed of steel, preferably of a soft grade, and which are provided at their ends with annular coupling flanges 11 disposed at substantially right angles to the axis of the pipe sections. When the mating ends of the latter are brought together their flanges are disposed side by side in abutting relation for fastening them about their entire circumference to produce a rolled or swedged calked joint capable of withstanding high pressures.

The means shown in the drawing for producing this calked joint at the pipe-flanges 10 consists of a split ring 12, likewise made of soft steel, and having a circumferential groove 13 in its inner side for receiving the marginal portions of said flanges. As shown in Figure 2, the ring-groove is flared inwardly so as to readily fit over the coupling flanges when originally applying it thereto. After fitting the grooved-ring around the flanges, the same is firmly compressed or pinched against the sides of the flanges by a rolling or swedging operation performed by a suitable tool designed for that purpose. This tool may be constructed in accordance with the one shown in my Patent No. 1,743,477, which is adapted to be guided around a track encircling the periphery of the grooved-ring and includes opposing pressure rollers arranged to bear against opposite sides of the ring to compress them firmly against the coupling flanges 11. The operating elements of this tool are shown in Figures 3 and 4, wherein 14 indicates the track having a grooved inner face which fits over and is temporarily held on the periphery of the clamping ring, and 15, 15 the pressure rollers which engage the opposite sides of the ring as the tool is propelled about the same.

The steps of the method of swedging or calking the joint are illustrated in Figures 2, 3 and 4, and after applying the ring 12 to the coupling flanges 11 and securing the track 14 in place for guiding the tool in a circumferential path around the joint, the tool is mounted thereon and travels one or more times about the same to seal the joint. In its movement around the joint the rollers 15 of the tool bear against the inner side portions of the ring which embrace the pipe-flanges and force such portions firmly and tightly against the flanges, uniting the ring with the latter which become contracted at their inner ends to form a substantially dovetailed joint, as shown in Figure 3. In addition to this action, the rollers are designed to also pinch or compress the ring in a radial direction between them and the track 14. This causes the inner opposing edges of the ring to be further compressed and to be simultaneously displaced outwardly relatively to the flanges to wedge the same tightly in place and exert a tremendous pressure against the flanges, as shown in Figure 4. The abutting ends of the sealing ring 12 may be welded or otherwise fastened.

If desired, a lead or other soft packing may be disposed between the abutting ends of the ring 12, the packing shown in Figures 5 and 6 consisting of a strip 16 disposed in the bottom of the ring-groove 13 and having a rib or projection 17 intermediate its ends adapted to extend between the opposing ends of the ring in the manner shown in Figure 5. When the ring is drawn tightly about the coupling flanges 11 the rib on the strip is compressed or flattened out to form a sealing across the abutting ends of the ring.

As shown in Figures 3 and 4, the inner side or peripheral edge of the clamping ring 12 terminates outwardly a suitable distance from the points of junction of the flanges 11 with their respective pipe-sections to permit the inner portions of the flanges to flex freely when necessary without straining the joint, as during contraction or expansion of the pipe sections.

This improved joint is also applicable for use in connection with concrete pipe-sections 18, as shown in Figure 7, the metallic pipes 19 being embedded in the concrete to reinforce the same and prevent water seeping through it. In this case the adjoining faces of the concrete-sections are grooved as shown at 20, and after the joint is made in the manner heretofore described, the groove is filled in with concrete.

In cases where the thickness of the pipe-sections is relatively thin, the coupling flanges 11 may be thickened and gradually tapered from their outer toward their inner edges.

I claim as my invention:—

1. In a pipe joint, a pair of pipe-sections made of a relatively soft metallic material and each provided at its ends with annular coupling flanges, a split clamping ring having an annular groove in its inner side for engaging the adjoining flanges of the pipe-sections and pressed thereon to form a calked joint, and a packing seated in the bottom of the groove and having a projection thereon extending between the abutting ends of the clamping ring.

2. In a pipe joint, a pair of pipe-sections made of a relatively soft metallic material and each provided at its ends with annular coupling flanges, and a preformed, split clamping ring having an inwardly-flaring groove in its inner side for engaging the adjoining flanges of the pipe-sections, those portions of the ring on either side of its groove being adapted to be compressed into the flanges whereby a fluid-tight calked, dovetailed joint is formed, the inner side of the clamping ring terminating outwardly from the points of junction of said coupling flanges with their pipe-sections to permit the inner portions of the flanges to flex during expansion and contraction of the sections.

3. The method of making a pipe-joint including flanged pipe-sections and a grooved coupling ring engaging the flanges of adjoining sections, said flanges being disposed at substantially right angles to the pipe axis in parallel abutting relation, which consists in applying the ring to the section-flanges with its groove receiving such flanges by peripheral pressure, holding said ring in place on the flanges, and applying a pressure on opposite sides of said ring at points opposite its groove to force the same into swedging relation with said flanges.

4. The method of making a pipe-joint including flanged pipe-sections and a grooved coupling ring engaging the flanges of adjoining sections, said flanges being disposed at substantially right angles to the pipe axis in parallel abutting relation, which consists in applying the ring to the section-flanges with its groove receiving such flanges, holding said ring in place on the flanges by peripheral pressure, and applying both a lateral and a radially outward pressure against the opposite sides of the ring to swedge the same against said flanges and to simultaneously force the inner edges of said ring outwardly relatively to the flanges to produce a dovetail joint and whereby the ring is contracted both laterally or radially about the flanges.

5. The method of making a fluid-tight pipe joint including flanged pipe-sections and a grooved coupling ring engaging the flanges of adjoining sections, said flanges being disposed at substantially right angles to the pipe-axis in parallel abutting relation, which consists in applying the ring to the section-flanges with its groove receiving such flanges, applying a substantially uniform pressure on opposite sides of said ring in a direction axially of the pipe and a pressure at the inner side portions thereof in a direction approximately radially of the pipe to swedge the ring to the joint-flanges into a completely united structure.

6. The method of making a fluid-tight pipe joint including flanged pipe-sections and a grooved coupling ring of substantially circular cross-section engaging the flanges of adjoining sections, said flanges being disposed at substantially right angles to the pipe-axis in parallel abutting relation, which consists in applying the ring to the section-flanges with its groove receiving such flanges, applying a substantially uniform pressure on opposite sides of said ring inwardly of its center in a direction axially of the pipe and an inward radial pressure at the periphery of said ring.

7. The method of making a fluid-tight pipe joint including flanged pipe-sections and a grooved coupling ring engaging the flanges of adjoining sections, said flanges being disposed at substantially right angles to the pipe-axis in parallel abutting relation, which consists in applying the ring to the section-flanges with its groove receiving such flanges, applying a substantially uniform pressure on opposite sides of said ring in a direction both axially of the pipe and radially outward to swedge the ring against said flanges and force the inner edges or the ring outward relatively to the flanges, and simultaneously applying an inwardly-directed radial pressure at the periphery of the ring.

ALBERT G. PERKINS.